United States Patent
Kato

(10) Patent No.: US 9,310,226 B2
(45) Date of Patent: Apr. 12, 2016

(54) POSITION DETECTION APPARATUS, DRIVE CONTROL APPARATUS, AND LENS APPARATUS

(71) Applicant: CANON KABUSHIKI KAISHA, Tokyo (JP)

(72) Inventor: Takashi Kato, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 169 days.

(21) Appl. No.: 14/139,656

(22) Filed: Dec. 23, 2013

(65) Prior Publication Data
US 2014/0183346 A1 Jul. 3, 2014

(30) Foreign Application Priority Data
Dec. 27, 2012 (JP) ................. 2012-284437

(51) Int. Cl.
*G01D 5/347* (2006.01)

(52) U.S. Cl.
CPC .......... *G01D 5/3473* (2013.01); *G01D 5/34792* (2013.01)

(58) Field of Classification Search
CPC ....................................................... G01D 5/34
USPC ............ 250/231.1–231.18; 33/706, 707, 1 N, 33/1 PT; 341/13, 14; 356/616, 617
See application file for complete search history.

(56) References Cited

U.S. PATENT DOCUMENTS 4,988,945 A * 1/1991 Nagase .................. 324/175

FOREIGN PATENT DOCUMENTS

| JP | 06323867 A | 11/1994 |
|---|---|---|
| JP | 08304113 A | 11/1996 |
| JP | 2013088152 A | 5/2013 |

* cited by examiner

Primary Examiner — Renee D Chavez
(74) Attorney, Agent, or Firm — Canon USA Inc. IP Division

(57) ABSTRACT

A position detection apparatus includes a signal output configured to output a plurality of signals, the position detection apparatus detecting a relative position of a position detection target from a reference position on the basis of the plurality of signals, a relative position detection unit configured to detect the relative position of the position detection target from the reference position on the basis of the plurality of signals, an absolute position detection unit configured to detect an absolute position of the position detection target on the basis of the plurality of signals; and a reference position setting unit configured to set the absolute position detected by the absolute position detection unit as the reference position.

7 Claims, 15 Drawing Sheets

POSITION DETECTION APPARATUS, DRIVE CONTROL APPARATUS, AND LENS APPARATUS

BACKGROUND OF THE INVENTION

1. Field of the Invention

The present invention relates to a position detection apparatus, a drive control apparatus, and a lens apparatus.

2. Description of the Related Art

A so-called absolute position detection unit such as a potentiometer and a so-called relative position detection unit such as an optical system incremental type rotary encoder are proposed for a lens position detection unit of an image pickup apparatus in general.

An absolute type rotary encoder (hereinafter, which will be referred to as "absolute encoder") is used for an absolute position detection unit. The absolute encoder can uniquely detect a position of a position detection target. In a case where the absolute encoder is used for the lens position detection unit, the absolute position can be found out immediately after power-on, and also the position detection can be carried out at a high accuracy.

A vernier type absolute encoder is used for the absolute encoder (see Japanese Patent Laid-Open No. 8-304113). The vernier type absolute encoder includes a main track and at least one sub track, and the main track and the sub track are composed of grating patterns. Slit pitches of the grating patterns constituting the main track and the sub track are different from each other. The vernier type absolute encoder is an encoder configured to set a section where a fine deviation of detection signals caused by a difference in the slit pitches between these respective tracks circulates once as an absolute position (absolute positioning).

The following problem occurs in a case where the vernier type absolute encoder (absolute position detection unit) disclosed in Japanese Patent Laid-Open No. 8-304113 is used as the lens position detection unit.

At the time of the power-on of the image pickup apparatus, signals of the plurality of tracks of the vernier type absolute encoder are read out at the same time and combined with each other to calculate the absolute position. However, when a lens or an operation ring corresponding to the position detection target is moved at the time of the power-on of the image pickup apparatus, a temporal lag is caused in timings for A/D conversion in a system where the signals read out from the plurality of tracks are sequentially subjected to the A/D conversion. As a result, a problem occurs that a signal synchronism is not secured, and an accurate position detection is not carried out.

To solve the above-mentioned problem, it is conceivable to use the relative position detection unit such as the optical system incremental type rotary encoder instead of the absolute position detection unit for the lens position detection unit of the image pickup apparatus. Although the incremental type rotary encoder has an advantage that the position can be detection at a higher accuracy as compared with the potentiometer, the incremental type rotary encoder also has a disadvantage that zero return for identifying a reference position is to be carried out at the time of the power-on or at the time of the recovery from an emergency stopped state.

SUMMARY OF THE INVENTION

In view of the above, the present invention provides a position detection apparatus that uses a relative position detection unit and that does not perform zero return for identifying a reference position.

According to an aspect of the present invention, a position detection apparatus includes: a signal output unit that is arranged to be opposite to a scale unit and configured to read patterns of the scale unit and output a plurality of signals, the position detection apparatus detecting a relative position of a position detection target that moves in synchronism with the scale unit or the signal output unit from a reference position on the basis of the plurality of signals; a relative position detection unit configured to detect the relative position of the position detection target from the reference position on the basis of the plurality of signals; an absolute position detection unit configured to detect an absolute position of the position detection target on the basis of the plurality of signals; and a reference position setting unit configured to set the absolute position detected by the absolute position detection unit as the reference position.

Further features of the present invention will become apparent from the following description of exemplary embodiments with reference to the attached drawings.

DESCRIPTION OF THE EMBODIMENTS

First Embodiment

Hereinafter, a device according to a first embodiment of the present invention will be described on the basis of the drawings. In the following description, the absolute position refers to a position of a position detection target at a time when a predetermined position in a movement range of the position detection target is set as an origin. The relative position refers to a moving direction and a moving amount from a particular position of the position detection target (reference position).

Figure 1:
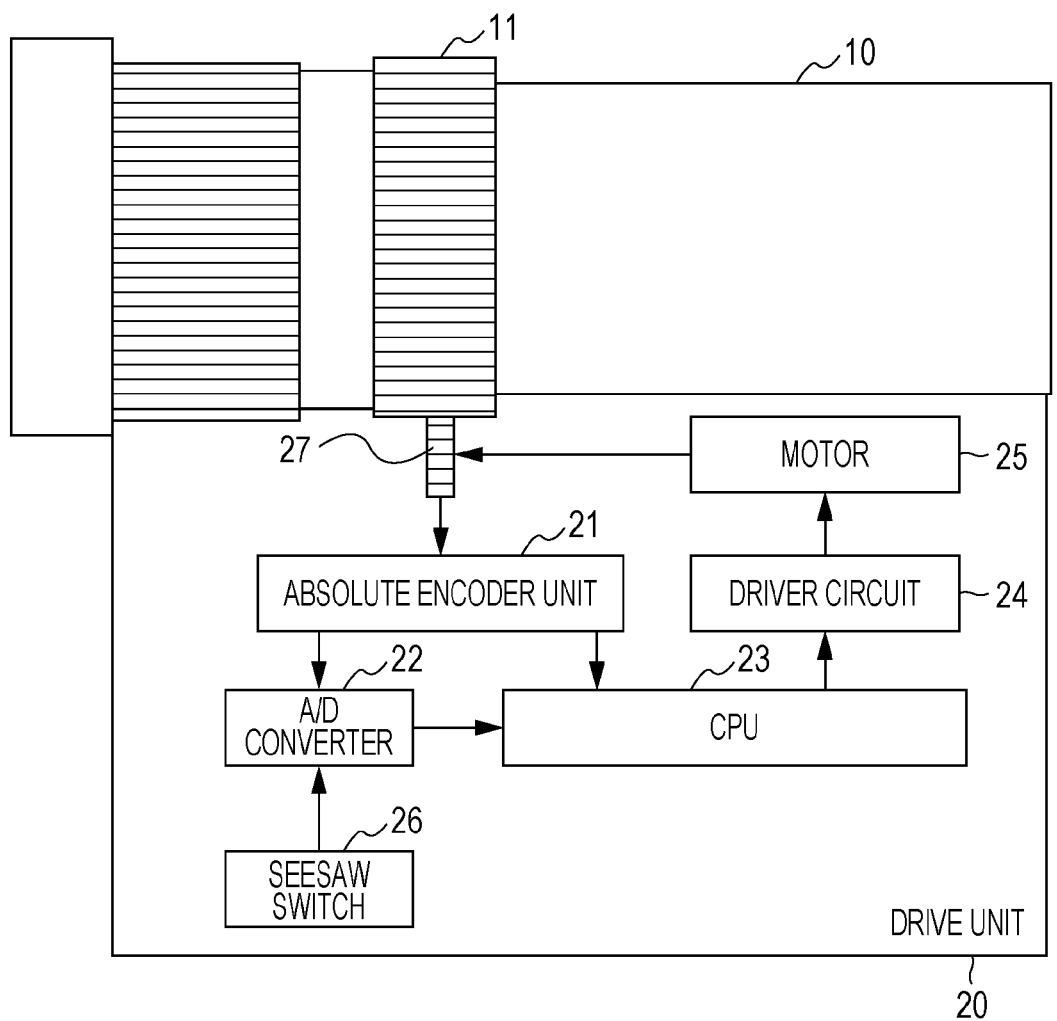
FIG. 1 is a block diagram of a lens apparatus including a position detection apparatus according to embodiments of the present invention.

FIG. 1 is a block diagram of a lens apparatus including a position detection apparatus according to embodiments of the present invention. A zoom lens (optical member) 10 can realize zooming by moving a zoom ring 11. An absolute encoder unit (encoder) 21 includes a scale unit 213 (see FIG. 3) that includes a plurality of patterns having mutually different periods and a signal output unit 211 (see FIG. 2) that is arranged to be opposite to the scale unit 213 and configured to read patterns of the scale unit 213 and output a plurality of analog signals. The scale unit 213 is moved in synchronism with the zoom ring (position detection target) 11. The zoom ring 11 and the scale unit 213 are designed to be moved in synchronism with each other via a gear 27. While the patterns of the scale unit 213 are read by the signal output unit 211, the position detection of the zoom ring 11 can be executed. The signal output unit 211 instead of the scale unit 213 may be moved in synchronism with the zoom ring 11.

An analog signal output from the absolute encoder unit 21 is transmitted to an A/D converter (A/D conversion unit) 22 and converted into a digital signal to be output to a CPU 23. The CPU 23 computes the output signal from the absolute encoder unit 21, so that it is possible to calculate the absolute position of the zoom ring 11.

A seesaw switch 26 (hereinafter, which may also be referred to as "seesaw") is an operation member for performing a zoom operation (for operating the zoom ring 11). An operation amount of the seesaw 26 is transmitted to the A/D converter 22 as an analog signal, and the analog signal is converted into a digital signal to be transmitted to the CPU 23 as a zoom command signal. The CPU 23 outputs a zoom drive signal to a driver circuit 24 in response to the zoom command signal. The driver circuit 24 drives a motor 25 in response to the zoom drive signal from the CPU 23 to drive the zoom ring 11. The zoom ring 11 can be electrically operated through the series of these operations.

Figure 2:
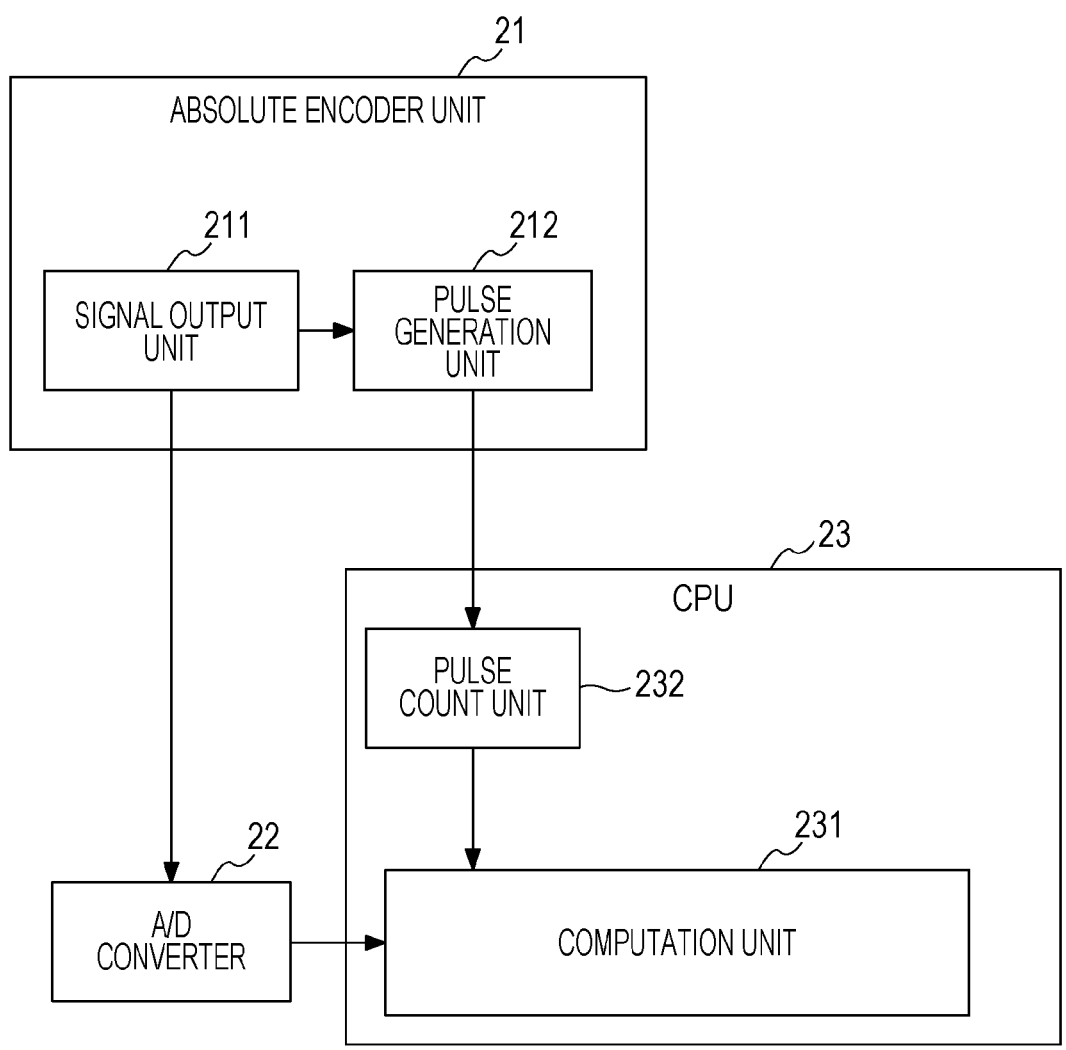
FIG. 2 is a block diagram of the position detection apparatus according to the embodiments of the present invention.

FIG. 2 is a block diagram of the absolute encoder unit 21 serving as the position detection apparatus and its surrounding devices. The signal output from the signal output unit 211 that is configured to read the pattern of the scale and is arranged to be opposite to the scale (scale unit) 213 that moves in synchronism with the zoom ring (position detection target) 11 changes along with the change in the rotation position of the zoom ring 11.

Figure 3:
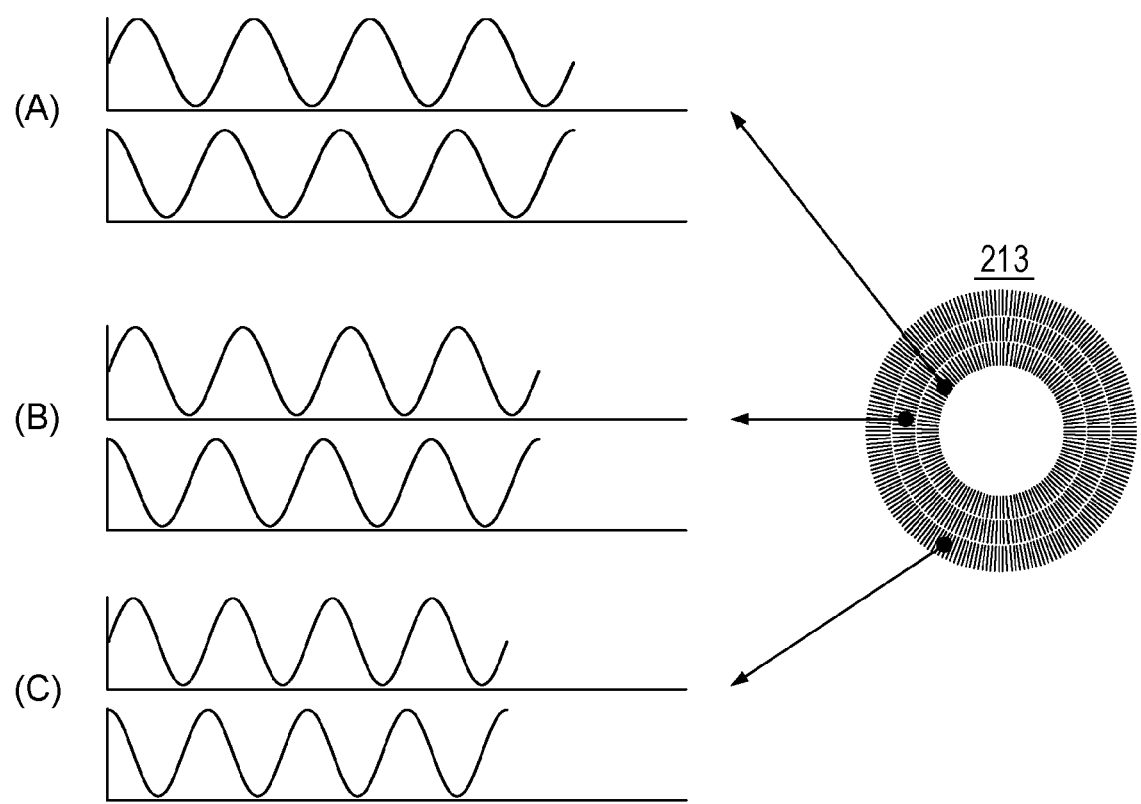
FIG. 3 illustrates relationships between patterns (tracks) of an absolute encoder and signals read from the patterns (tracks).

FIG. 3 illustrates changes of the signals in the signal output unit 211, and two-phase sinusoidal signals (analog signals) are output from one track. According to the present embodiment, the scale (scale unit) 213 includes three tracks (vernier patterns) having mutually different vernier pitches. With respect to the three tracks (patterns), the two-phase sinusoidal signals (analog signals) having different frequencies represented by (A), (B), and (C) of FIG. 3 are detected and output. The plurality of two-phase sinusoidal signals (analog signals) are sequentially converted into a plurality of digital signals by the A/D converter 22 and then transmitted to a computation unit (absolute position detection unit) 231 of the CPU 23, and the plurality of digital signals are used for a computation for calculating the absolute position.

A pulse generation unit 212 is configured to convert the analog signals detected and output by the signal output unit 211 into pulse signals.

Figure 4A:
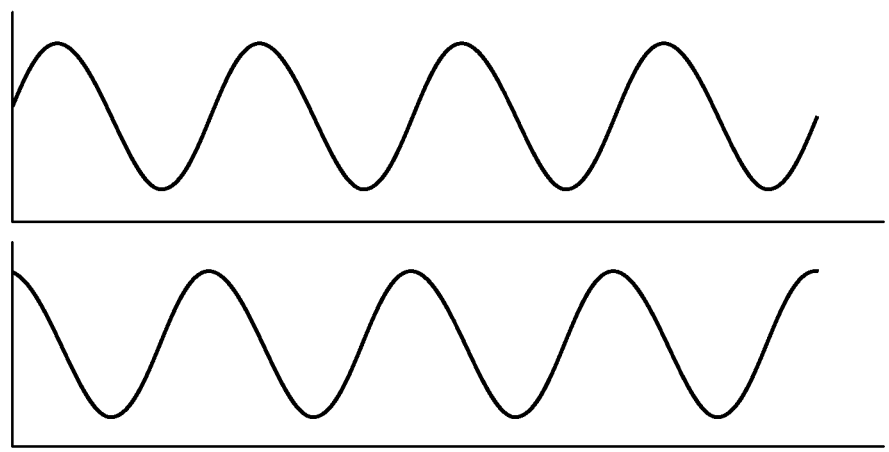
FIGS. 4A and 4B are explanatory diagrams for describing analog signal-pulse conversion of an encoder.
Figure 4B:
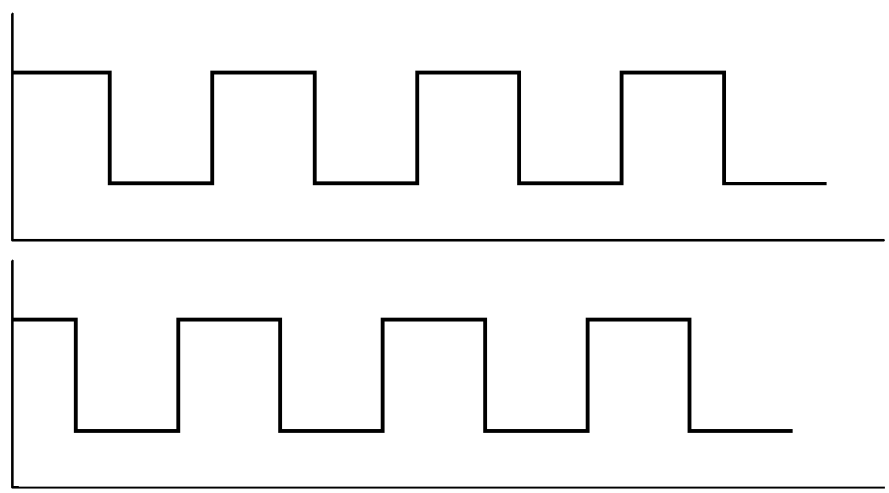

FIG. 4A illustrates input signals to the pulse generation unit 212, and FIG. 4B illustrates output signals from the pulse generation unit 212. Pulse signals (output signals from the pulse generation unit 212) are transmitted to a pulse count unit 232, and changes in the pulses are counted. The value counted by the pulse count unit 232 is transmitted to the computation unit 231.

Figure 5:
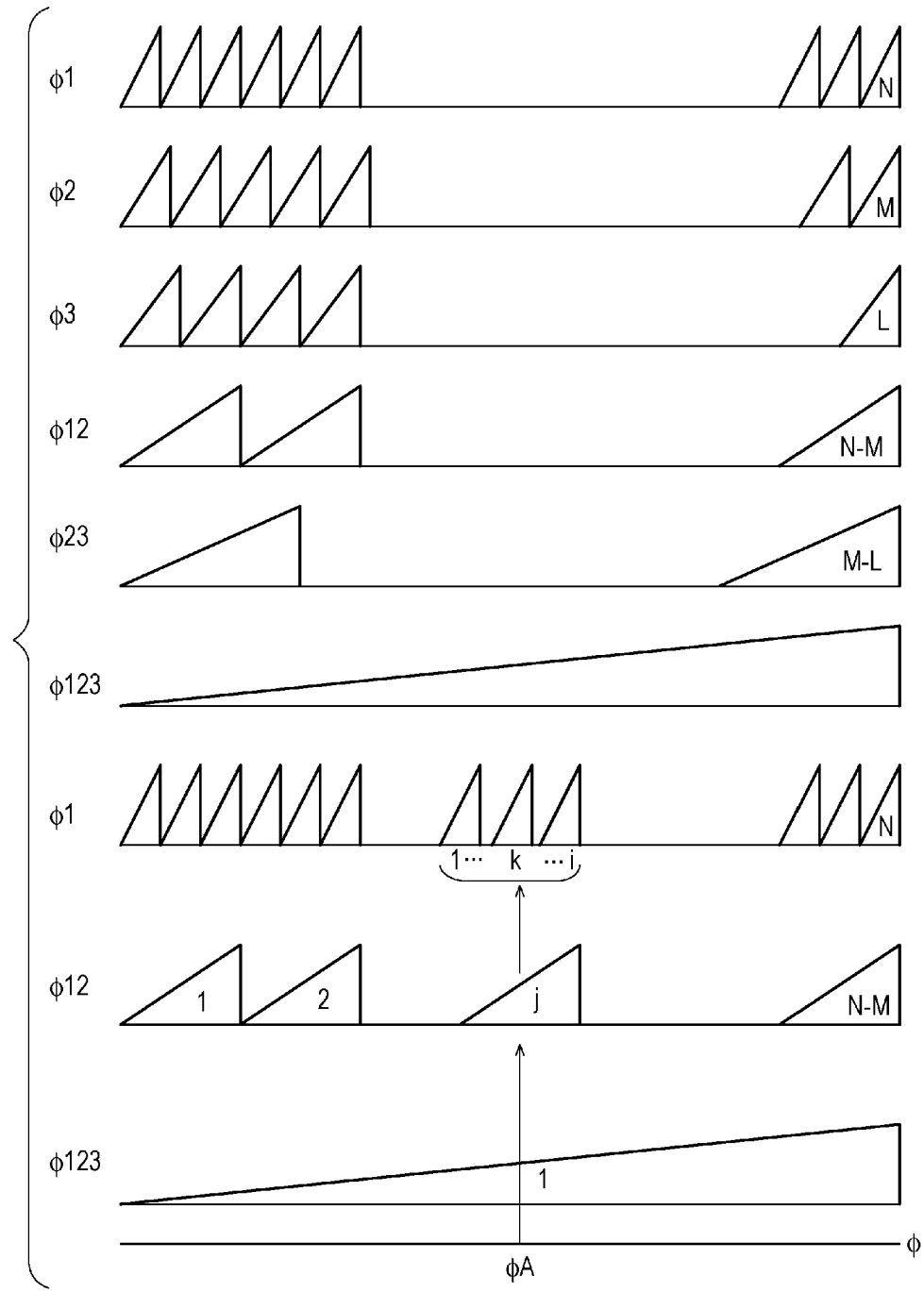
FIG. 5 is an explanatory diagram for describing phase information for an absolute value computation.

Next, a method of calculating an absolute position from an analog signal output from the signal output unit 211 of the absolute encoder unit 21 in the computation unit (absolute position detection unit) 231 will be described. A phase signal $\phi$ composed of a plurality of phase waveforms is calculated with respect to each of the respective tracks (patterns) by using the plurality of digital signals obtained through the sequential A/D conversion of the plurality of analog signals output with respect to the respective tracks (patterns) (which are detected by the signal output unit 211). $\phi 1$, $\phi 2$, and $\phi 3$ of FIG. 5 respectively represent phase signals obtained from an innermost track, an intermediate track, and an outermost track of the scale 213 illustrated in FIG. 3. The following computation is executed by the computation unit 231 by using these phase signals $\phi 1$, $\phi 2$, and $\phi 3$.

$$\phi 12 = \phi 1 - \phi 2$$

$$\phi 23 = \phi 2 - \phi 3$$

$$\phi 123 = \phi 12 - \phi 23$$

A change from a phase angle 0 to $2\pi$ with respect to one rotation of the scale 213 is repeated by N times in the phase signal $\phi 1$, repeated by M times in the phase signal $\phi 2$, and repeated by L times in the phase signal $\phi 3$. Herein, N, M, and L satisfy the following relationships.

$$N - L = 1$$

$$N = i(N - M)$$

The above-described change is repeated by (N−M) times in a phase signal $\phi 12$, repeated by (M−L) times in a phase signal $\phi 23$, and repeated by (N−L) times in the phase signal $\phi 123$. Therefore, since the number of repetitions in the phase signal $\phi 123$ is N−L=1, the rotation angle of the scale 213 can be obtained from a value equivalent to the phase angle in the phase signal $\phi 123$.

Next, when the phase angle in the phase signal $\phi 123$ is set as $\phi A$, the j-th waveform among the (N−M) repetitions in the phase signal $\phi 12$ is identified. Furthermore, i phase signals $\phi 1$ exist in the j-th waveform in the phase signal $\phi 12$, and the k-th phase signal $\phi 1$ in the i waveforms is identified. As a result, the rotation angle (absolute position) $\phi$ of the scale 213 can be obtained (detected) by identifying locations of the N phase angles $\phi 1$ where the number of divisions is highest. The position data obtained through this phase computation is defined as the absolute position data Pabs.

Next, processing (state detection processing) of detecting a state of the zoom ring (position detection target) 11 from the pulse signals output from the pulse generation unit 212 of the absolute encoder unit 21 by the computation unit (state detection unit) 231 will be described.

Figure 6:
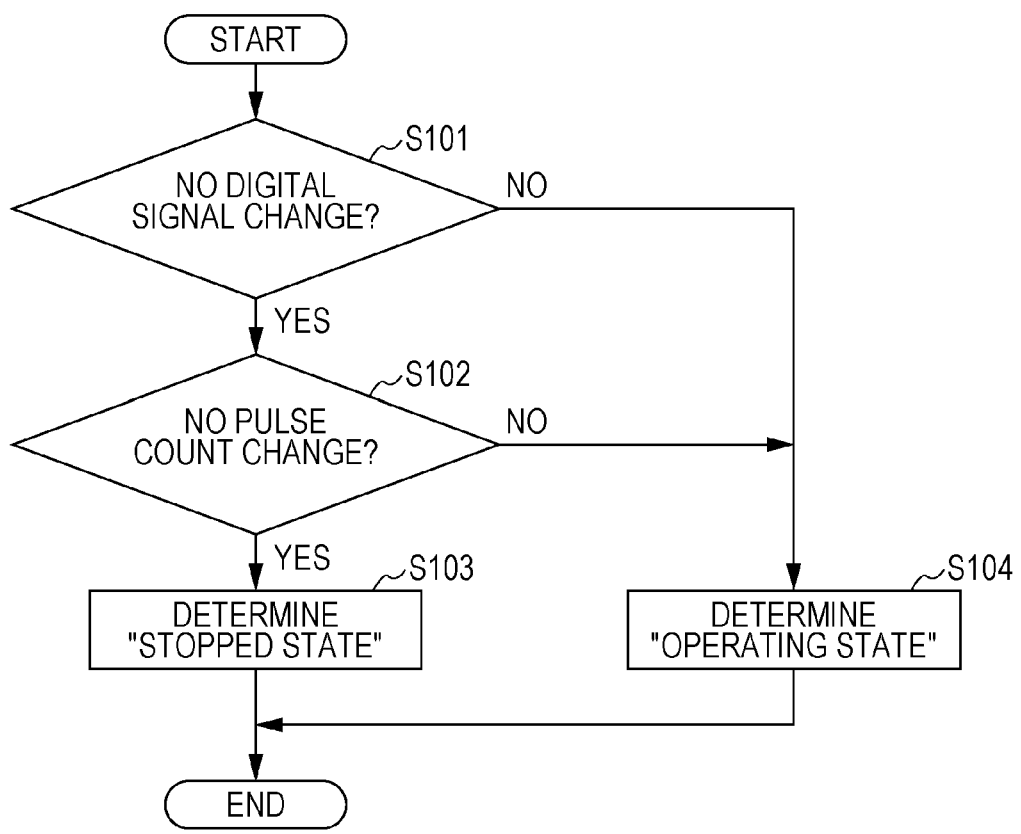
FIG. 6 is a flow chart of state detection processing according to the first embodiment of the present invention.

FIG. 6 is a flow chart of a state detection of the zoom ring (position detection target) 11 in the computation unit (state detection unit) 231 (state detection of the zoom ring 11 by the absolute encoder unit 21 via the gear 27). To elaborate, the flow chart is for determining whether or not the zoom ring 11 is rotated and driven. In step S101, it is confirmed whether or not a change exists in the digital signal output from the A/D converter 22. The process proceeds to step S102 in a case where no change exists, and the process proceeds to step S104 in a case where the change exists and it is determined as "operating state". In step S102, it is confirmed whether or not a change exists in the count value in the pulse count unit 232 (whether or not a change exists in the pulse signals output from the pulse generation unit 212). The process proceeds to step S103 in a case where no change exists and it is determined as "stopped state", and the process proceeds to step S104 in a case where the change exists and it is determined as "operating state".

Next, processing of calculating and setting the reference position will be described.

Figure 7:
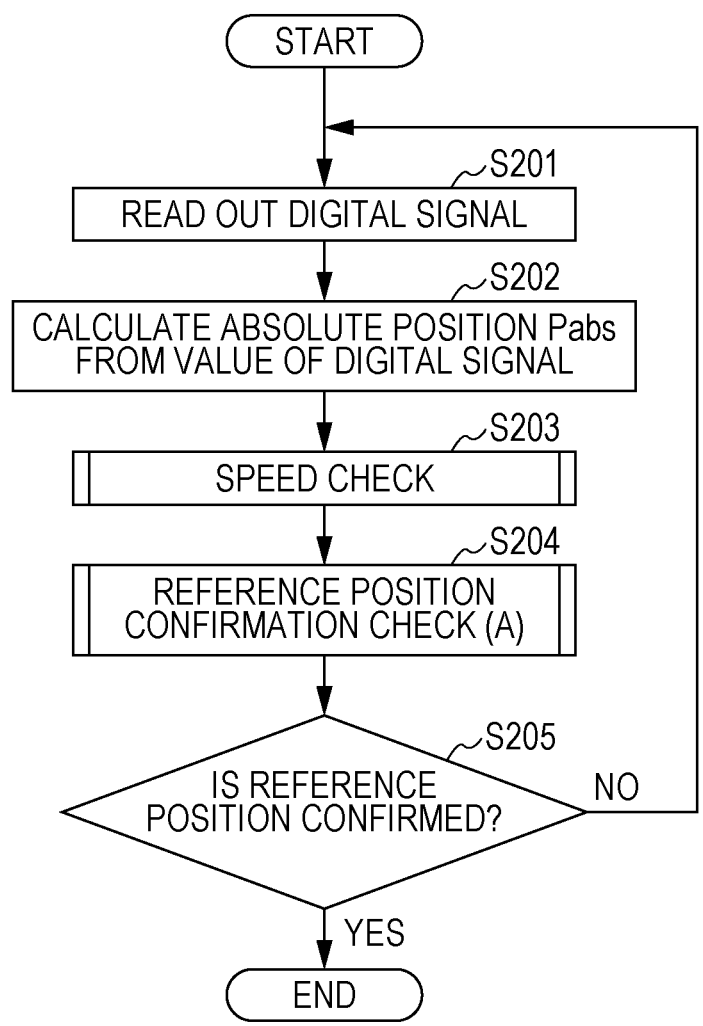
FIG. 7 is a flow chart of reference position calculation processing according to the first embodiment of the present invention.

FIG. 7 is a flow chart of processing of calculating the reference position after power-on (reference position calculation processing). This flow chart is composed of steps S201 and S202 corresponding to the processing in the computation unit (absolute position detection unit) 231 and step S203 to S205 corresponding to the processing in the computation unit (reference position setting unit) 231.

In step S201, the digital signals are read out from the A/D converter 22. Next, the phase computation is executed from the values of the digital signals read out in step S202 to calculate the absolute position (absolute position data) Pabs.

In step S203, a result of the state detection executed in the flow chart of FIG. 6 is checked (speed check). In step S204, processing in the flow chart of FIG. 8 (reference position confirmation check) which will be described below is executed. In step S205, it is checked whether or not the status of the reference position calculation is in the final confirmation state. The processing is ended in case of the final confirmation state, and the process returns to step S201 in a case where the status is not in the final confirmation state, and the processing of calculating the reference position is executed again.

Figure 8:
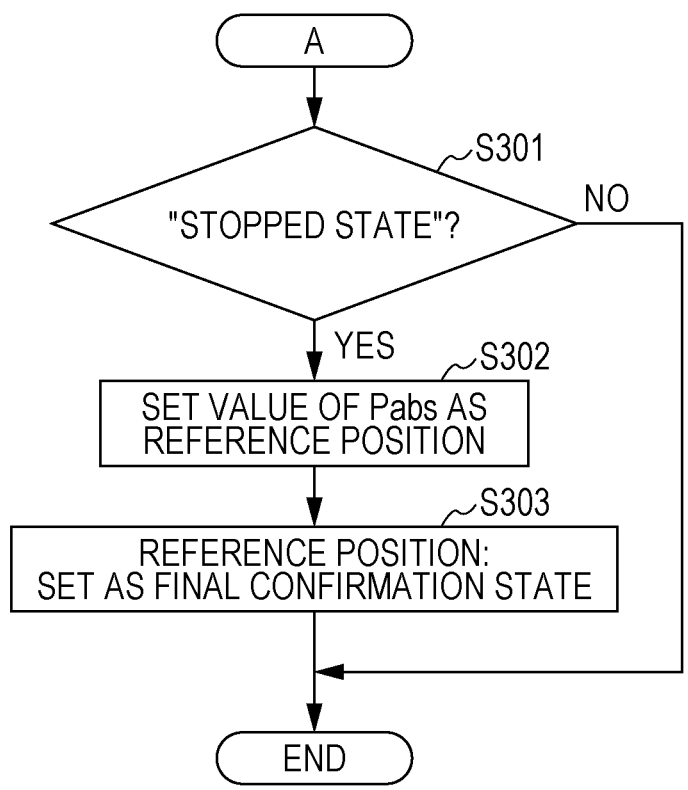
FIG. 8 is a flow chart of reference position setting processing according to the first embodiment of the present invention.

FIG. 8 is a flow chart of processing of determining whether or not the absolute position data Pabs obtained through the phase computation is set (used) as the reference position (reference position setting processing (A)). This flow chart is composed of steps S301 to S303 corresponding to the processing in the computation unit (reference position setting unit) 231.

In step S301, the result of the state detection executed in the flow chart of FIG. 6 is confirmed, and the process proceeds to step S302 when it is determined as "stopped state". The processing (reference position setting processing) is ended without setting the reference position when it is not determined as "stopped state". In step S302, the value of the absolute position data Pabs obtained (detected) from the phase computation is set as the reference position. Next, in step S303, the status of the reference position calculation is set as the final confirmation state, and the processing (reference position setting processing) is ended.

Next, the position calculation processing after the reference position is set will be described.

When the setting on the reference position is ended in the processing in FIGS. 7 and 8, the position calculation for the zoom ring 11 is executed from a relationship expression between the reference position and a relative position counter value by using the relative position counter value.

Figure 9:
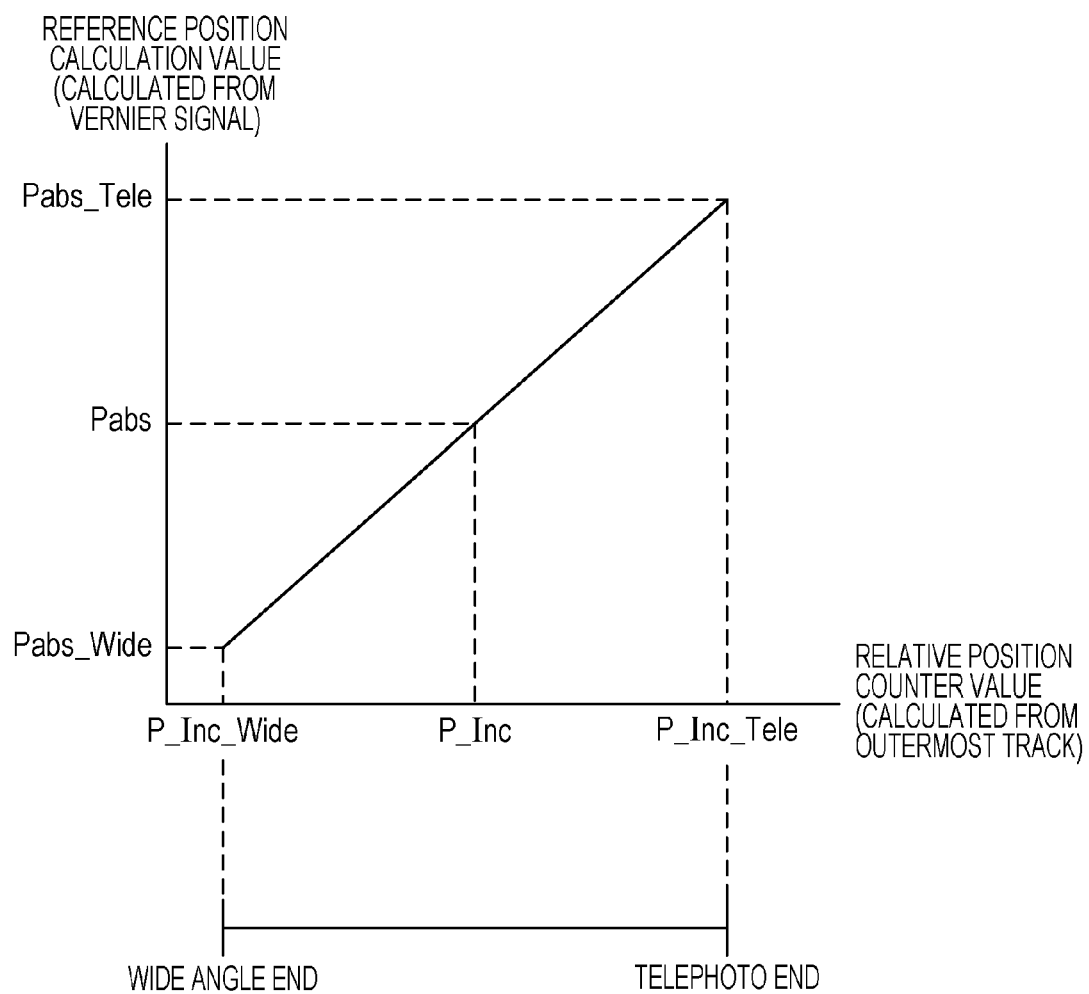
FIG. 9 illustrates a relationship between a reference position and a relative position signal.

FIG. 9 illustrates a relationship between a reference position calculation value calculated from the signals of the respective tracks and the relative position counter value. Position data of end positions in a movable range of the zoom ring 11 is obtained. Reference position data on a wide angle end and a telephoto end are Pabs_Wide and Pabs_Tele, respectively. Relative position counter values on the wide angle end and the telephoto end are P_Inc_Wide and P_Inc_Tele, respectively.

When the reference position calculation processing is ended in the flow chart of FIG. 7, the position calculation for the zoom ring 11 is executed from the relationship between the reference position calculation value and the relative position counter value by using the relative position counter value.

Figure 10:
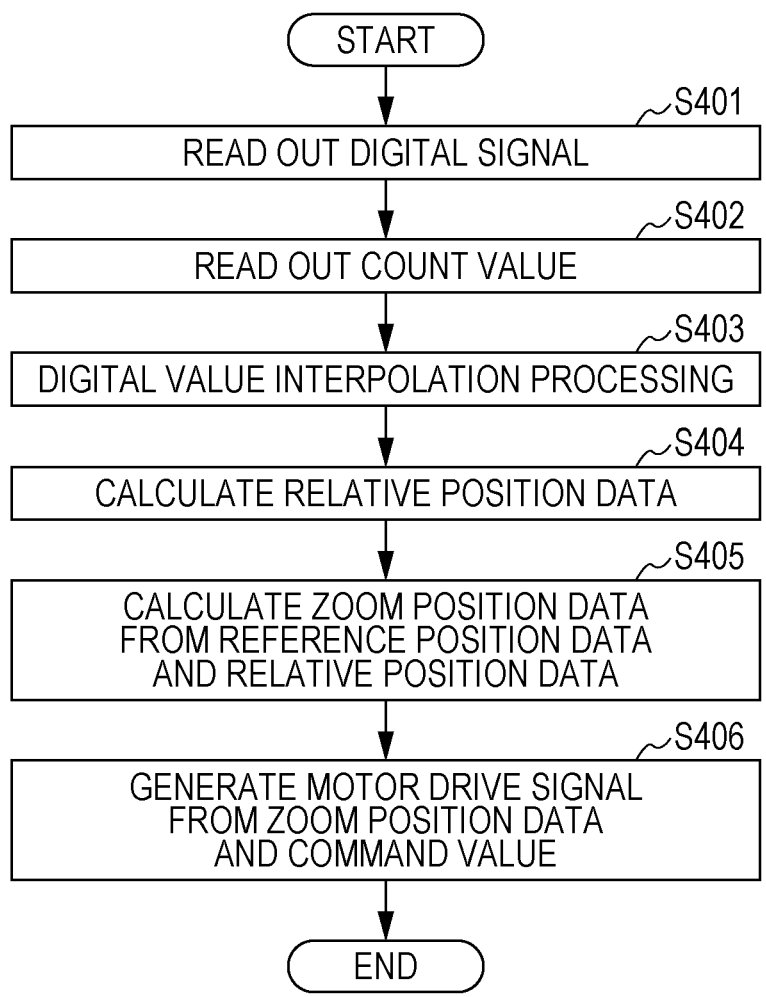
FIG. 10 is a flow chart of a position calculation of a zoom ring and a drive control.

FIG. 10 is a flow chart of the position calculation for the zoom ring 11 and the drive control after the reference position setting, and this flow chart is executed at a certain cycle.

In step S401, the computation unit (relative position detection unit) 231 reads out the digital signals from the A/D converter 22. In step S402, the computation unit (relative position detection unit) 231 reads out the counter value from the pulse count unit 232. Next, in step S403, counter value interpolation processing (processing of interpolating the signals output from the signal output unit 211) is executed. In step S404, the computation unit (relative position detection unit) 231 calculates the relative position data from the counter value and an interpolation processing result of the counter value.

In step S405, the computation unit (relative position detection unit) 231 calculates the position data (zoom position data) of the zoom ring 11 from the reference position data set in the flow chart of FIG. 8 and the relative position data calculated from the interpolation processing result. The position data (zoom position data) of the zoom ring 11 is represented by the moving direction and the moving amount from the reference position. In step S406, a drive signal for the motor 25 (motor drive signal) is generated from the position data (zoom position data) of the zoom ring 11 and the command value of the seesaw 26, and the drive the zoom ring 11 is executed.

It is therefore possible to set the absolute position calculation error caused by the movement of the zoom ring 11 to be small by setting the reference position in accordance with the state of the zoom ring 11 as described above.

Second Embodiment

Next, a second embodiment of the present invention will be described with reference to the drawings.

Figure 11:
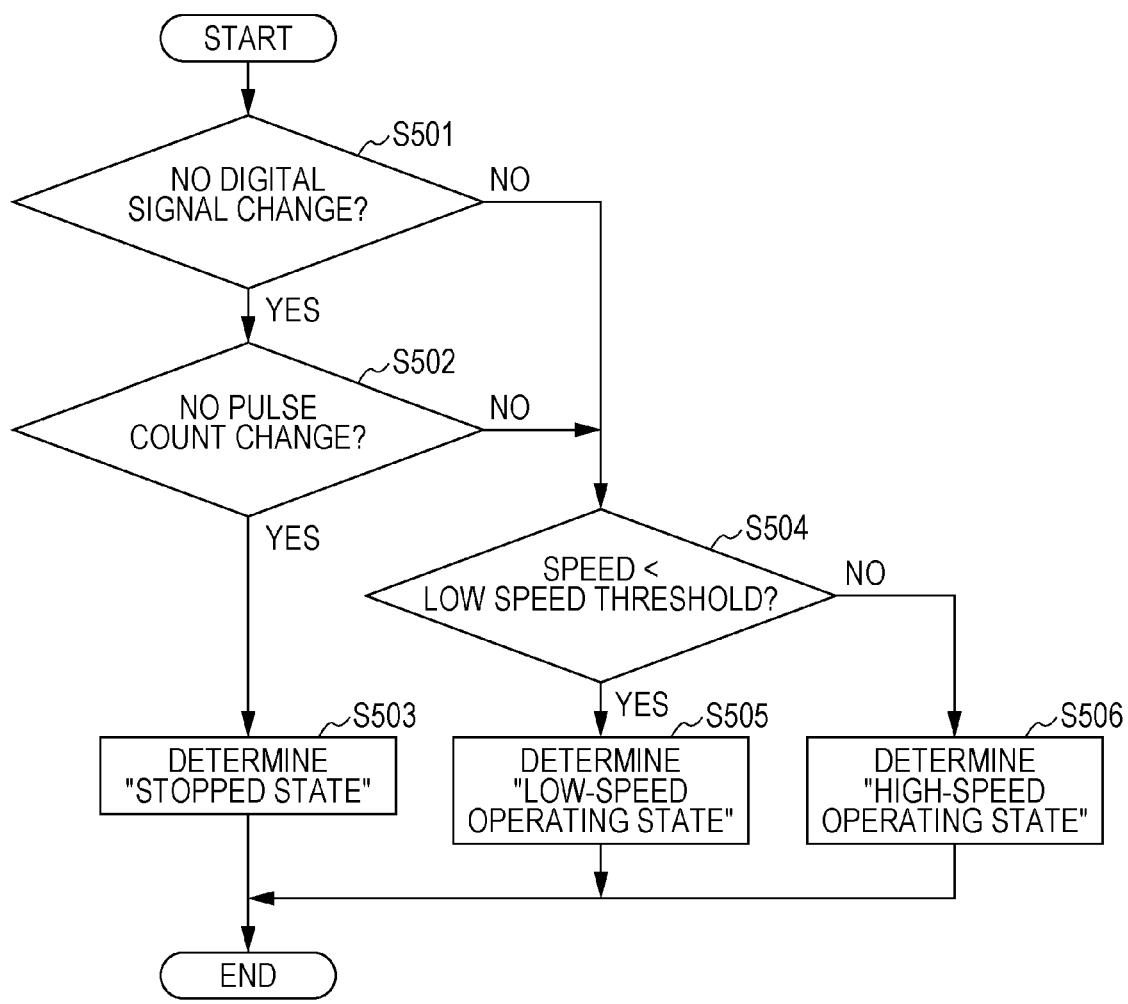
FIG. 11 is a flow chart of the reference position setting processing according to a second embodiment of the present invention.

FIG. 11 is a flow chart for determining whether or not the position detection target according to the second embodiment is moved. In step S501, it is confirmed whether or not a change exists in the values of the digital signals output from the A/D converter 22 by the computation unit (state detection unit) 231. In case of the absence of the change, the process proceeds to step S502, and in case of the presence of the change, the process proceeds to step S504. In step S502, the computation unit (state detection unit) 231 confirms whether or not a change in the count value in the pulse count unit 232 exists. In a case where no change exists, the process proceeds to step S503, and it is determined as "stopped state", and in a case where the change exists, the process proceeds to step S504. In step S504, the computation unit (state detection unit) 231 confirms whether or not a speed change is lower than a low speed threshold which will be described below from the change in the digital signals and the count value. In a case where the speed change is lower than the low speed threshold, the process proceeds to step S505, and it is determined as "low-speed operating state", and in a case where the speed change is higher than or equal to the low speed threshold, the process proceeds to step S506, and it is determined as "high-speed operating state".

Next, a determination method for the low speed threshold will be described. For example, when the phase angle of the phase ϕ123 is set as ϕA in FIG. 5, the processing of identifying the j-th waveform in the (N−M) repetitions in φ12 is executed. However, an error is generated in the computation result of φ123 since timings of the A/D conversion is shifted in a state where the zoom ring 11 is moved at a high speed, and the j-th waveform in φ12 is identified in some cases. A speed at which the j-th waveform in φ12 is identified because of the delay of the A/D conversion is set as the low speed threshold. Herein, the state in which the phase of φ12 can be identified from φ123 corresponds to the setting of the low speed threshold, but a speed at which the phase of φ1 can be identified from φ12 may be set as the low speed threshold.

Figure 12:
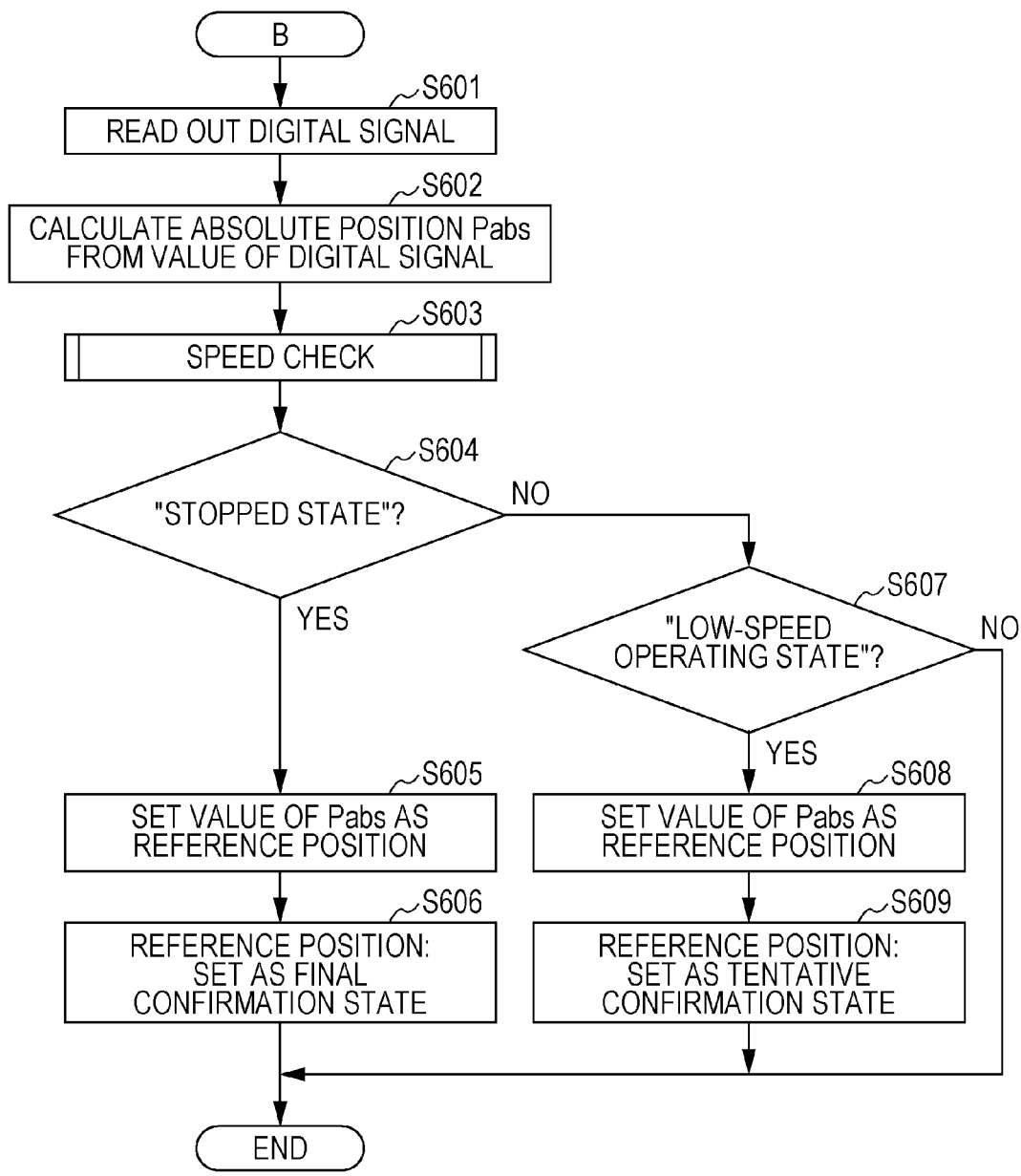
FIG. 12 is a flow chart of speed detection processing according to the second embodiment of the present invention.

FIG. 12 is a flow chart of the reference position setting processing according to the second embodiment. This flow chart is composed of steps S601 and S602 corresponding to the processing in the computation unit (absolute position detection unit) 231 and steps S603 to S609 corresponding to the processing in the computation unit (reference position setting unit) 231.

In step S601, the digital signals are read out from the A/D converter 22. Next, the phase computation is executed from the values of the digital signals read out in step S602 to calculate the absolute position data Pabs.

In step S603, the result of the speed detection executed in the flow chart of FIG. 11 is checked, and the process proceeds to step S604. In step S604, in a case where the state detection result is "stopped state", the process proceeds to step S605, and in other cases, the process proceeds to step S607. In step S605, the value of the absolute position data Pabs obtained from the phase computation is set as the reference position (confirmed reference position). Next, in step S606, the status of the reference position calculation is set as the final confirmation state, and the processing is ended. In step S607, the speed detection result is checked again, and when the speed detection result is "low-speed operating state", the process proceeds to step S608. In step S608, the value of the absolute position data Pabs obtained from the phase computation is set as the reference position (tentative reference position). Next, in step S609, the status of the reference position calculation is set as a tentative confirmation state, and the processing is ended.

Figure 13:
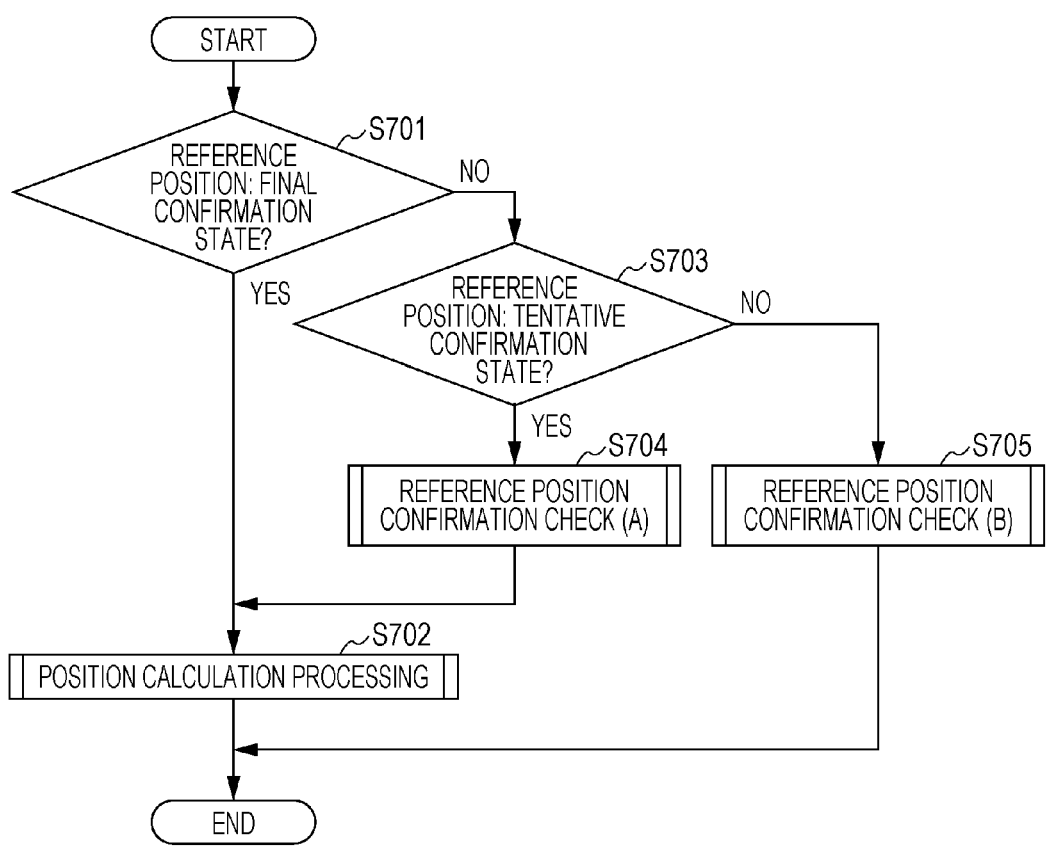
FIG. 13 is a flow chart of absolute position calculation processing according to the second embodiment of the present invention.

FIG. 13 is a flow chart for the position calculation carried out after the execution of the reference position determination processing of FIG. 12, and the position calculation is executed at a certain cycle. In step S701, it is checked whether or not the status of the reference position calculation is the final confirmation state. In case of the final confirmation state, the process proceeds to step S702, and in other cases, the process proceeds to step S703. In step S702, the processing of the position calculation and the drive control described in the flow chart of FIG. 10 is executed. In step S703, it is checked whether or not the status of the reference position calculation is the tentative confirmation state. In the case of the tentative confirmation state, the process proceeds to step S704, and in other cases, the process proceeds to step S705.

In step S704, the processing of the reference position confirmation check (A) described in the flow chart of FIGS. 7 and 8 is executed, and the process thereafter proceeds to step S702. In step S705, the processing of the reference position confirmation check (B) described in the flow chart of FIG. 12 is executed again, and the processing is ended.

It is therefore possible to set the absolute position calculation error caused by the movement of the zoom ring 11 to be small by determining the state of the zoom ring 11 to determine the reference position as described above. In a case where the speed is low, it is possible to calculate the position even when the position detection target is moved by executing the position calculation while the reference position is set as the tentative confirmation state.

Third Embodiment

Next, a third embodiment of the present invention will be described with reference to the drawings.

According to the third embodiment too, the speed detection processing described in FIG. 11 according to the second embodiment is executed at a certain cycle.

Figure 14:
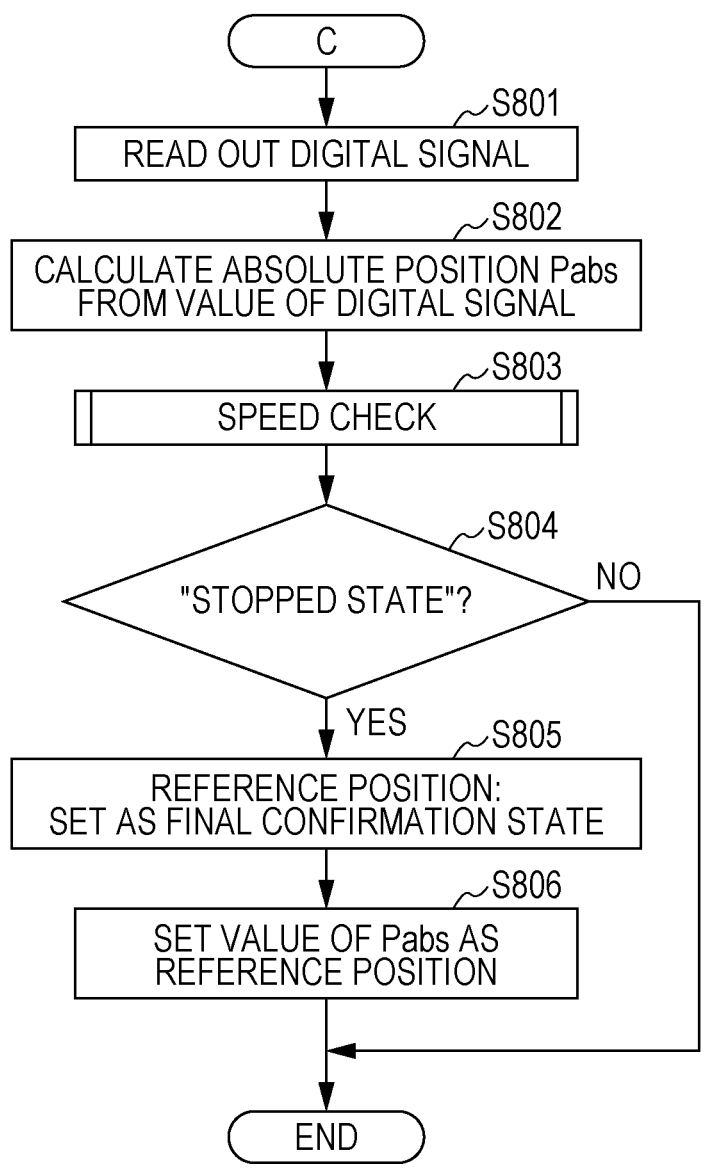
FIG. 14 is a flow chart of the reference position setting processing according to a third embodiment of the present invention.

FIG. 14 is a flow chart for the reference position setting processing according to the third embodiment. In step S801, the digital signals are read out from the A/D converter 22. Next, the phase computation is executed from the values of the digital signals read out in step S802 to calculate the absolute position data Pabs. In step S803, the result of the speed detection executed in the flow chart of FIG. 11 is checked, and the process proceeds to step S804. In step S804, when the speed detection result is "stopped state", the process proceeds to step S805, and in other cases, the process proceeds to step S806. In step S805, the status of the reference position calculation is set as the final confirmation state. In step S806, after the status of the reference position calculation is confirmed, the value of the absolute position data Pabs obtained from the phase computation is set as the reference position used for the detection of the relative position of the position detection target, and the processing is ended.

Figure 15:
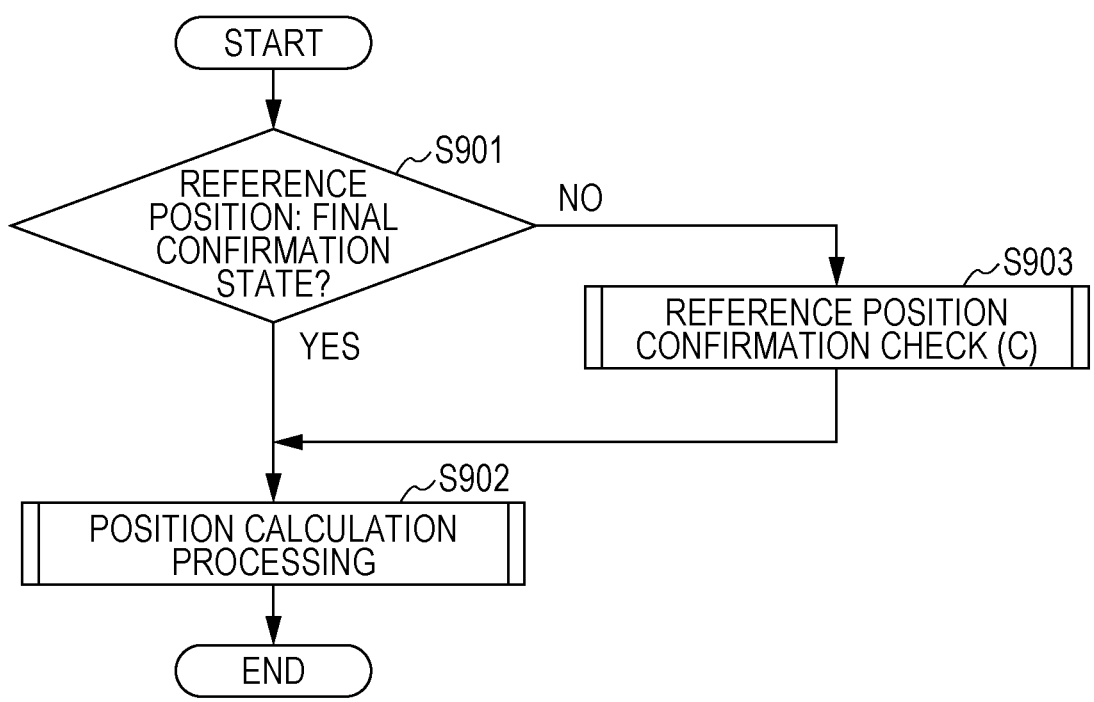
FIG. 15 is a flow chart of the reference position calculation processing according to the third embodiment of the present invention.

FIG. 15 is a flow chart of a position calculation carried out after the execution of the reference position determination processing of FIG. 14, and the position calculation is executed at a certain cycle. In step S901, it is checked wither or not the status of the reference position calculation is the final confirmation state. The process proceeds to step S902 in the case of the final confirmation state, and the process proceeds to step S903 in other cases. In step S902, the processing of the position calculation and the drive control described in the flow chart of FIG. 10 is executed. In step S903, the processing of the reference position confirmation check described in the flow chart of FIG. 14 is executed again, and the process proceeds to step S902.

It is therefore possible to set the error calculated at the time of the movement to be small and determine the position by calculating the reference position even when the position detection target is moved and determining the final reference position after the stopped state is established as described above. Even when the position detection target is moved, it is possible to use the position data for a purpose where the positional accuracy is restricted by calculating the reference position.

The embodiments of the present invention have been described above, but the present invention is not limited to these embodiments, and various modifications and alterations can be made within a range of the gist of the invention.

For example, according to an embodiment of the present invention, it may be determined that the position detection target is in the stopped state in a case where the phase waveforms of the basic phase signals (φ1, φ2, and φ3) corresponding to the phases of the lower-order phase signals (φ12 and φ23) can be identified.

In addition, according to an embodiment of the present invention, the computation unit (absolute position detection unit) 231 may also determine that the position detection target is in the low-speed operating state in a case where phase waveforms of the basic phase signals (φ1, φ2, and φ3) corresponding to the phases of the lower-order phase signals (φ12 and φ23) are not identified and also phase waveforms of the lower-order phase signals ($\phi12$ and $\phi23$) corresponding to a phase of an upper-order phase signal ($\phi123$) can be identified.

Moreover, according to an embodiment of the present invention, the computation unit (absolute position detection unit) 231 may also determine that the position detection target is in the high-speed operating state in a case where the phase waveforms of the lower-order phase signals ($\phi12$ and $\phi23$) corresponding to the phase of the upper-order phase signal ($\phi123$) is not identified.

Effect of the Invention

According to the embodiments, the present invention can provide the position detection apparatus that uses the relative position detection unit and that does not perform the zero return for identifying the reference position.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-284437, filed Dec. 27, 2012, which is hereby incorporated by reference herein in its entirety.

What is claimed is:

1. A position detection apparatus comprising:
   a signal output unit that is arranged to be opposite to a scale unit and configured to read patterns of the scale unit and output a plurality of signals, the position detection apparatus detecting a relative position of a position detection target that moves in synchronism with the scale unit or the signal output unit from a reference position on the basis of the plurality of signals;
   a relative position detection unit configured to detect the relative position of the position detection target from the reference position on the basis of the plurality of signals;
   an absolute position detection unit configured to detect an absolute position of the position detection target on the basis of the plurality of signals;
   a reference position setting unit configured to set the absolute position detected by the absolute position detection unit as the reference position; and
   a state detection unit configured to detect a state of the position detection target,
   wherein the state includes a stopped state in which the position detection target is stopped, a low-speed operating state in which the position detection target is operated at a low speed, and a high-speed operating state in which the position detection target is operated at a higher speed than in the low-speed operating state,
   wherein the absolute position detection unit determines that the absolute position is used in a case where the state is the stopped state or the low-speed operating state and determines that the absolute position is not used in a case where the state is the high-speed operating state, and
   wherein the reference position setting unit sets the absolute position determined to be used by the absolute position detection unit as a confirmed reference position corresponding to the reference position that has been confirmed in a case where the state is the stopped state and sets the absolute position as a tentative reference position corresponding to the reference position that has tentatively been set in a case where the state is the low-speed operating state.

2. The position detection apparatus according to claim 1, wherein the absolute position detection unit calculates a plurality of phase signals each composed of a plurality of phase waveforms by using a plurality of digital signals output with respect to each of a plurality of patterns included in the scale unit.

3. The position detection apparatus according to claim 2, wherein the plurality of phase signals include a plurality of basic phase signals corresponding to the phase signals calculated by using a plurality of digital signals obtained by sequentially subjecting a plurality of analog signals output with respect to each of a plurality of patterns included in the scale unit to A/D conversion by the A/D conversion unit, a plurality of lower-order phase signals calculated from the plurality of basic phase signals, and an upper-order phase signal calculated from the plurality of lower-order phase signal, and wherein the absolute position detection unit determines that the position detection target is in the stopped state in a case where phase waveforms of the basic phase signals corresponding to phases of the lower-order phase signals can be identified.

4. The position detection apparatus according to claim 3, wherein the absolute position detection unit determines that the position detection target is in the low-speed operating state in a case where the phase waveforms of the basic phase signal corresponding to the phases of the lower-order phase signal are not identified and also phase waveforms of the lower-order phase signals corresponding to a phase of the upper-order phase signal can be identified.

5. The position detection apparatus according to claim 4, wherein the absolute position detection unit determines that the position detection target is in the high-speed operating state in a case where the phase waveforms of the lower-order phase signals corresponding to the phase of the upper-order phase signal are not identified.

6. A drive control apparatus comprising:
   a position detection apparatus including
      a signal output unit that is arranged to be opposite to a scale unit and configured to read patterns of the scale unit and output a plurality of signals, the position detection apparatus detecting a relative position of a position detection target that moves in synchronism with the scale unit or the signal output unit from a reference position on the basis of the plurality of signals,
      a relative position detection unit configured to detect the relative position of the position detection target from the reference position on the basis of the plurality of signals,
      an absolute position detection unit configured to detect an absolute position of the position detection target on the basis of the plurality of signals, and
      a reference position setting unit configured to set the absolute position detected by the absolute position detection unit as the reference position;
   a state detection unit configured to detect a state of the position detection target,
      wherein the state includes a stopped state in which the position detection target is stopped, a low-speed operating state in which the position detection target is operated at a low speed, and a high-speed operating state in which the position detection target is operated at a higher speed than in the low-speed operating state,
      wherein the absolute position detection unit determines that the absolute position is used in a case where the state is the stopped state or the low-speed operating state and determines that the absolute position is not used in a case where the state is the high-speed operating state, and wherein the reference position setting unit sets the absolute position determined to be used by the absolute position detection unit as a confirmed reference position corresponding to the reference position that has been confirmed in a case where the state is the stopped state and sets the absolute position as a tentative reference position corresponding to the reference position that has tentatively been set in a case where the state is the low-speed operating state; and a drive control unit configured to drive and control the position detection target, wherein the drive control unit controls the position detection target in a case where the absolute position detection unit detects the absolute position.

7. A lens apparatus comprising:

an optical member functioning as a position detection target; and a drive control apparatus including
- a position detection apparatus that includes
  - a signal output unit that is arranged to be opposite to a scale unit and configured to read patterns of the scale unit and output a plurality of signals, the position detection apparatus detecting a relative position of a position detection target that moves in synchronism with the scale unit or the signal output unit from a reference position on the basis of the plurality of signals,
  - a relative position detection unit configured to detect the relative position of the position detection target from the reference position on the basis of the plurality of signals,
  - an absolute position detection unit configured to detect an absolute position of the position detection target on the basis of the plurality of signals, and
  - a reference position setting unit configured to set the absolute position detected by the absolute position detection unit as the reference position,
  - a state detection unit configured to detect a state of the position detection target,
  - wherein the state includes a stopped state in which the position detection target is stopped, a low-speed operating state in which the position detection target is operated at a low speed, and a high-speed operating state in which the position detection target is operated at a higher speed than in the low-speed operating state,
  - wherein the absolute position detection unit determines that the absolute position is used in a case where the state is the stopped state or the low-speed operating state and determines that the absolute position is not used in a case where the state is the high-speed operating state, and
  - wherein the reference position setting unit sets the absolute position determined to be used by the absolute position detection unit as a confirmed reference position corresponding to the reference position that has been confirmed in a case where the state is the stopped state and sets the absolute position as a tentative reference position corresponding to the reference position that has tentatively been set in a case where the state is the low-speed operating state; and
- a drive control unit configured to drive and control the position detection target, wherein the drive control unit controls the position detection target in a case where the absolute position detection unit detects the absolute position.

* * * * *